United States Patent Office 3,770,697
Patented Nov. 6, 1973

3,770,697
CURABLE POLYCARBONATE COMPOSITIONS
Fred F. Holub and Milton L. Evans, Schenectady, N.Y.,
assignors to General Electric Company
No Drawing. Original application July 1, 1969, Ser. No.
838,306, now Patent No. 3,652,715. Divided and this
application Apr. 30, 1971, Ser. No. 139,210
Int. Cl. C08g 17/13
U.S. Cl. 260—47 XA    9 Claims

ABSTRACT OF THE DISCLOSURE

Polycarbonate compositions are provided comprising polycarbonates substituted with at least one chemically-combined aliphatically unsaturated imido radical, such as a maleimido radical. The imido-substituted polycarbonates can be blended with various aliphatically unsaturated monomers, such as styrene, chlorostyrene, N-phenyl maleimide, diallylphthalate, triallylcyanurate, etc. and various organic polymers, such as polystyrene, polycarbonate, polysulfone, polyphenyleneoxide, polyurethane, etc. The polycarbonate, compositions of the present invention can be employed as molding compounds, for making films, laminates, etc.

---

This application is a division of our copending application Ser. No. 838,306, filed July 1, 1969, entitled Curable Polycarbonate Compositions, now U.S. Pat. 3,652,715.

The present invention relates to polycarbonates having chemically-combined aliphatically unsaturated imido radicals, and methods for making these materials.

The polycarbonate compositions of the present invention have at least one chemically combined aliphatically unsaturated imido radical of the formula, (1)

$$R \diagdown \begin{matrix} C=O \\ \phantom{C}\diagdown \\ \phantom{CC}N- \\ \phantom{C}\diagup \\ C=O \end{matrix}$$

referred to hereinafter as an "M" radical, which can be joined to a carbon atom in an aromatic carbocyclic ring in the polycarbonate backbone, or terminal position by a divalent organo radical, referred to hereinafter as a "Q" radical, and together referred to as either an "imidoorgano" or MQ-radical, where R in Formula 1 is an aliphatically unsaturated divalent organic radical, selected from hydrocarbon radicals and halogenated hydrocarbon radicals such as, for example, $$X_2C=C-$$
$$\cdot X_2C-$$
$$XC-$$
$$XC-$$

$$\begin{matrix} X_2 \\ C \\ XC \diagup \diagdown X \\ \| \phantom{XX} C- \\ XC \diagdown \diagup \\ C \\ X_2 \end{matrix}$$

$$\begin{matrix} X \\ C \\ XC \diagup \diagdown X \\ \| \phantom{XX} CX_2 \phantom{X} C- \\ XC \diagdown \diagup \phantom{XX} C- \\ C \diagup X \\ X \end{matrix}$$

etc., where X is selected from hydrogen, halogen, such as chloro, or lower alkyl such as methyl, ethyl, propyl, butyl etc. having from 1 to 8 carbon atoms.

The imido-substituted polycarbonate compositions, of the present invention have at least one chemically-combined M-radical of Formula 1, or MQ-radical, as previously defined, and consist essentially of chemically-combined carbonate units of the formula, (2)

$$-OZO\overset{O}{\underset{\|}{C}}-$$

or orthocarbonate units of the formula, (3)

$$-OZO\overset{R'''}{\underset{\underset{R'''}{|}}{\overset{|}{\underset{O}{C}}}}-$$

where Z is selected from M or MQ-substituted divalent organo radicals, or a mixture of radicals comprising such M or MQ-substituted divalent organo radicals, and divalent organo radicals free of M or MQ-substitution, where M is an imido radical included by Formula 1, and Q is a divalent organo connective defined below.

Z radicals can be M or MQ-substituted and include, for example, radicals selected from,
(a) aromatic carbocylic radicals having from 6 to 18 carbon atoms selected from hydrocarbon radicals and halogenated hydrocarbon radicals,
(b) AYA radicals, where A is selected from (a) radicals and Y is a divalent organo connective defined below,
(c) a mixture of (a) and (b),
(d) a mixture of organo radicals having at least 5 mole percent of chemically combined (a), (b) or (c) radicals, and up to 95 mole percent of chemically combined divalent saturated aliphatic radicals selected from hydrocarbon radicals and halogenated hydrocarbon radicals, based on the total moles of (d) radicals, and Y is a divalent organo connective selected from, $$-\overset{R'}{\underset{R'}{\overset{|}{C}}}-, \; -O-, \; -OR''O-, \; -S-, \; -\overset{O}{\underset{\|}{S}}-, \; -\overset{O}{\underset{\underset{O}{\|}}{S}}-, \; -\overset{R'}{\underset{R'}{\overset{|}{Si}}}$$

R' is a monovalent radical selected from hydrogen, hydrocarbon radicals, and halogenated hydrocarbon radicals, R" is a divalent radical selected from hydrocarbon radicals and halogenated hydrocarbon radicals, R''' is selected from monovalent hydrocarbon radicals and halogenated monovalent hydrocarbon radicals, and Q is a divalent radical selected from, $$R'', \; -R''\overset{O}{\underset{\|}{C}}-, \; -R''\overset{O}{\underset{\|}{C}}O-, \; -R''O\overset{O}{\underset{\|}{C}}-, \; -R''O\overset{O}{\underset{\|}{C}}O-,$$

$$-R''N\overset{H}{\underset{\underset{O}{\|}}{C}}-, \; -R''O\overset{H}{\underset{\underset{O}{\|}}{C}}N-$$

etc.

Radicals included by Z are, for example, arylene radicals such as phenylene, chlorophenylene, tolylene, xylene, naphthylene, chloronaphthylene, anthrylene, etc.; divalent organo radicals such as,

[structures: bisphenol-A type, diphenyl sulfone type, and dimethylsilyl diphenyl type]

etc.; alkylene radicals having from 1 to 8 carbon atoms such as methylene, ethylene, trimethylene, tetra methylene, penta methylene, etc. Radicals included by R", are all of the aforementioned arylene radicals, halogenated arylene radicals, and alkylene radicals included by Z. Radicals included by R' are, for example, hydrogen, aryl radicals, and halogenated aryl radicals, such as phenyl, chlorophenyl, tolyl, naphthyl, etc.; aralkyl radicals such as benzyl, phenylethyl, etc.; aliphatic radicals, cycloaliphatic radicals and haloaliphatic radicals, for example methyl, ethyl, propyl, chloropropyl, trifluoropropyl, butyl, pentyl, hexyl, octyl, etc., cyclobutyl, cyclohexyl, cycloheptyl, etc. Radicals included by R''' are all of the aforementioned R' radicals except hydrogen. In the above formulas, or formulas shown hereinafter, where R, R', R'', R''', A, Z, etc., can represent more than one radical, these radicals can be all the same or any two or more of the aforementioned radicals respectively.

As indicated above, the carbonate units, or orthocarbonate units of Formulas 2 and 3 can be substituted with an M or MQ radical, and can be represented by an M-substituted unit, such as,

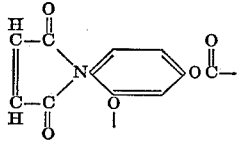

or an MQ-substituted unit such as,

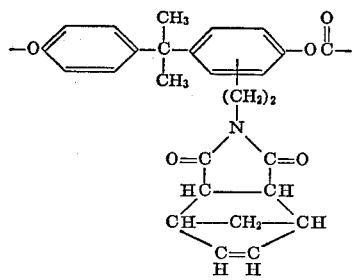

Some of the imido-substituted polycarbonate compositions of the present invention can be made by phosgenating a mixture having dihydroxy compound included by, (4)    HOAYAOH; HOAOH and a chain stopping compound selected from (e) an imido-substituted compound of the formula, (5)

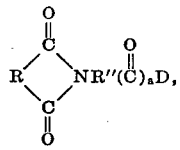

and (f) a mixture of (e) and a hydroxy compound of the formula, (6)    R'''OH where R, R'', R''', A and Y are as previously defined, D is selected from halogen and hydroxy, and $a$ is a whole number equal to 0 or 1. Alternatively, a bisphenol, which can be in the form of a mixture of dihydroxy compound of Formula 4, and up to 100 mole percent of a bisphenol having M or MQ-substitution can be phosgenated with chain-stopping compounds defined above.

A further technique of making imido-substituted polycarbonates of the present invention, is by effecting a Friedel-Crafts alkylation reaction of polycarbonate consisting essentially of chemically-combined carbonate units of the formulas, (7)

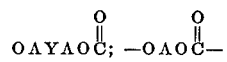

or orthocarbonate units of the formulas, (8)

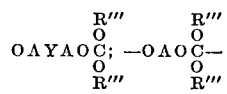

This Friedel-Crafts alkylation reaction is shown in copending application Ser. No. 838,322, filed July 1, 1969, now abandoned of J. F. Klebe and T. J. Windish, filed concurrently herewith and assigned to the same assignee as the present invention. In accordance with the method of Klebe et al., an imido-alkylene compound of the formula,

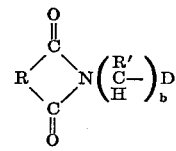

where R, R' and D are as previously defined, and $b$ is an integer which can be equal to 2 to 4 inclusive, is contacted with a polycarbonate in the presence of a Friedel-Crafts catalyst, such as boron trifluoride.

The preferred dihydroxy compounds included by Formula 4, are bisphenols of the formula, (9)

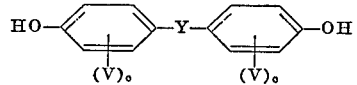

where Y is as previously defined, V is selected from halogen radicals and alkyl radicals, and $c$ is a whole number equal to 0 to 4, inclusive.

Among the preferred imido-substituted polycarbonates of the present invention, there are included polymers of the formula, (10)

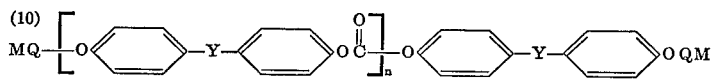

where M, Q, and Y are as previously defined, and $n$ is an integer equal to 1 to 1,000 or more, and preferably 5 to 500.

Bisphenols included by Formula 9 are, for example, 2,2-bis(4-hydroxyphenyl)propane(bisphenol-A);
2,4-dihydroxydiphenylmethane;
bis(2-hydroxyphenyl)methane;
bis(4-hydroxyphenyl)methane;
1,1-bis(4-hydroxyphenyl)ethane;
1,2-bis(4-hydroxyphenyl)ethane;
1,1-bis(4-hydroxy-2-chlorophenyl)ethane;
1,1-bis(2,5-dimethyl-4-hydroxyphenyl)ethane;
1,3-bis(3-methyl-4-hydroxyphenyl)propane;
2,2-bis(3-isopropyl-4-hydroxyphenyl)propane,
2,2-bis(4-hydroxyphenyl)hexylfluoropropane, etc.

In addition, 4,4'-sec-butylidenediphenol,
4,4'-methylene (2,6-ditert-butylphenol),
2,2'-methylene(4-methyl-6-tert-butylphenol),
bis(4-hydroxyphenyl)phenylmethane,
bis(4-hydroxyphenyl)cyclohexyl methane,
1,2-bis(4-hydroxyphenyl)-1,2-diphenyl ethane, etc.

In addition to the above bisphenols there are also included within the scope of the dihydroxy compounds of Formula 4 dihydroxy benzenes such as hydroquinone, resorcinol, etc., 4,4'-dihydroxydiphenyl, 2,2'-dihydroxydiphenyl, 2,4'-dihydroxydiphenyl, etc.

In addition, the bisphenols of Formula 9 also include dihydroxy compounds shown on page 69 of Chemistry and Physics of Polycarbonates by Herman Schnell, Interscience Publishers, John Wiley & Sons, New York (1964). For example, there are included dihydroxysulfones, such as bis(4-hydroxyphenyl)sulfone,
2,4'-dihydroxydiphenylsulfone,
5'-chloro-2,4'-dihydroxydiphenylsulfone,
5'-chloro-2',4-dihydroxydiphenylsulfone, etc.

In addition, dihydroxy aromatic ethers are included such as 4,4'-dihydroxytriphenyl ether, the 4,3'-4,2'-, 3,3'-, 2,2'-2,3'-, etc., dihydroxydiphenyl ethers, 4,4'-dihydroxy-2,5-dimethyldiphenyl ether, etc.

There are included by the imido-substituted compounds of Formula 5, compounds of the formulas,

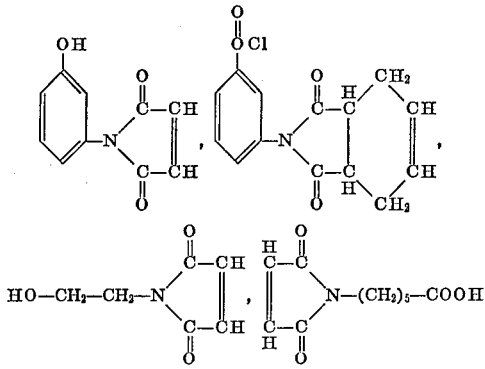

etc.

There are included by the hydroxy compounds of Formula 6,

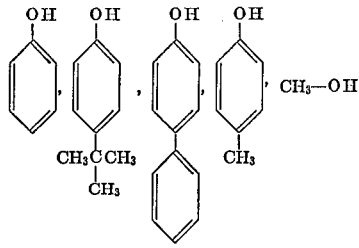

etc.

In addition to phosgenating mixtures of the dihydroxy compound of Formula 4, with imido-substituted compounds of Formula 5 or mixtures with hydroxy compounds of Formula 6, the imido-substituted polycarbonates of the present invention also can be made by an ester interchange reaction using a diarylcarbonate, in combination with mixtures of the dihydroxy compound of Formula 5.

As taught in copending application Ser. No. 709,913 of T. Takekoshi, filed Mar. 4, 1968 now Pat. 3,519,605, and assigned to the same assignee as the present invention, polyorthocarbonate polymers and copolymers consisting of chemically-combined units of Formula 8 can be made effecting reaction between dihydroxy compound of Formula 4 and dihalodiaryloxymethane of the formula, $$\begin{array}{c} R''' \\ | \\ O \\ | \\ X'CX' \\ | \\ O \\ | \\ R''' \end{array}$$

in the presence of a hydrogenhalide acceptor, where X' is halogen. These polyorthocarbonates polymers can be converted to imido-substituted polycarbonates of the present invention by the Friedel-Crafts alkylation reaction previously described or by contact with imido-substituted acyl halides included by Formula 5.

Preferably, the imido-substituted polycarbonates consist of from 5 to 50 mole percent of M, or MQ-substituted carbonate or orthocarbonate units, based on the total moles of carbonate units.

Some of the factors which can influence the characteristics and utility of the imido-substituted polycarbonates of the invention, are, for example, whether the M radicals are in the terminal position or along the polymer backbone, whether the polymer consists essentially of Formula 2 or 3 units, whether the units are alkylenecarbonate, arylenecarbonate or mixtures thereof, etc.

The imido-substituted polycarbonates can be used in molding applications, solvent resistant films and coatings, laminates, etc. When employed in an organic solvent, such as tetrachloroethylene, ethylenedichloride, etc., they can be used as varnishes, adhesives, sizing materials for various fibers such as glass, carbon, etc.; electrical and thermal insulating films and decorative coatings.

The imido-substituted polycarbonates of the present invention can be blended with various aliphatically unsaturated organic materials, such as aliphatically unsaturated organic monomers and certain organic polymers as well as organic polymers free of aliphatic unsaturation. Blends of the imido-substituted polycarbonate with the aforementioned organic monomers or polymers can be made over wide proportions by weight. Experience has shown that there can be employed as little as about 5 percent by weight of the imido-substituted polycarbonate to provide for cured products exhibiting such valuable characteristics as solvent resistance, resistance to deformation at elevated temperatures, improved toughness, etc. Depending upon the proportion of the imido-substituted polycarbonate and the organic polymer or monomer, the blends can provide for laminates, solventless varnishes, molding compounds, coating compositions, etc.

Included by the aliphatically unsaturated monomers that can be employed in combination with the imido-substituted polycarbonates are, for example, aliphatically unsaturated bisepoxides, styrene, bismaleimide, N-phenylmaleimide, vinylchloride, isobutylene, butadiene, isoprene, chlorotrifluoroethylene, 2-methylpentene-1; vinyl esters of organic carboxylic acids such as vinylformate, vinylacetate, acrylonitrile, vinylmethyl, methyl, butyl, etc., esters of acrylic and methacrylic acids, etc.; divinylbenzene, triallylcyanurate, triallyltrimellitate, and N-vinylphthalimide, N-allylphthalimide, N-allyltetrachlorophthalimide, etc. Among the organic polymers that can be employed in combination with the imido-substituted polycarbonates of the present invention are, for example, epoxy resins, polyvinylchloride, polyethylene, polypropylene, polysulfones, polystyrene, polyurethane, organopolysiloxanes, polyesters, polyphenyleneoxides, etc.

Cure of the blend of the imido-substituted polycarbonate and the aforementioned organic monomers or polymers, can be effected with conventional free radical initiators at temperatures of from 50° C. to 300° C., while 100° C. to 200° C. has sometimes been found to be more desirable. Acceleration of the cure can be achieved with organic peroxides, such as dicumylperoxide, benzoylperoxide, benzoylperoxide, tertiary butylperbenzoate, tertiary alkylperoxycarbonate, etc. The peroxides can be employed from about 0.01 percent to about 5 percent by weight, based on the total weight of the blend. In addition, the imido-substituted polycarbonates or blends thereof, in addition to being curable by the aforementioned free radical initiators, can be cured with heat or radiation with high energy electrons, X-rays, ultraviolet light, etc., depending upon the crosslinked density of the resulting imido-substituted polycarbonates.

In preparing the imido-substituted polycarbonates of the present invention, a mixture of a dihydroxy compound of Formula 4, hereinafter referred to as the "bisphenol" and the imido-substituted monomer of Formula 5 can be phosgenated at a temperature of between 25° C. to 45° C. An organic solvent can be employed with the aforementioned reactants to facilitate the formation of the imido-substituted polycarbonate. A suitable organic solvent is any organic solvent which is inert to the reactants under the conditions of the reaction and include, for example, methylenechloride, ethylenedichloride, etc. Proportions of imido-substituted monomer to the bisphenol can vary widely depending upon the degree of imido-substitution desired in the resulting imido-substituted polycarbonate. During phosgenation, the mixture is continuously agitated.

Recovery of the imido-substituted polycarbonate can be achieved by adding the mixture to an aliphatic alcohol, such as methanol. The termination of the phosgenation reaction can be determined when the mixture reaches its maximum temperature exotherm and then begins to drop. The final product can be recovered by standard techniques and stripped of solvent.

Friedel-Craft's alkylation of polycarbonate or polyorthocarbonate, can be achieved with an appropriate catalyst such as borontrifluoride at temperature in the range of between 0° C. to 125° C. in the presence of an appropriate organic solvent such as tetrachloroethane, nitrobenzene, mixtures thereof, etc.

In order that those skilled in the art will be better able to practice the invention, the following examples are given by way of illustration and not by way of limitation. All parts are by weight:

EXAMPLE 1

A mixture of 6.5 parts of p-maleimidobenzoic acid, 80 parts of pyridine, 650 parts of methylene chloride was phosgenated for 30 minutes at a rate of about 0.33 part of phosgene per minute, while the mixture was stirred. There was then added 54.7 parts of 2,2-bis(4-hydroxyphenyl)propane and the mixture was stirred for an additional 30 minutes. The mixture was then phosgenated for 85 minutes at a rate of 0.33 part of phosgene per minute.

An excess of 6 N-hydrochloric acid was added to the mixture to decompose any excess phosgene. The mixture was then poured into methanol in a Waring Blender which precipitated the polymer. A product was recovered which was dried in vacuo at 93° C. Based on method of preparation, there was obtained a maleimido-terminated polycarbonate polymer having the approximate formula,

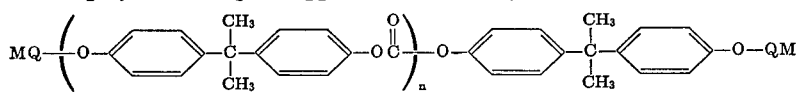

where $n$ is an integer having the approximate average value of 17, and MQ is,

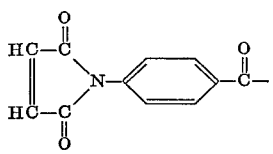

A blend was made of 98 parts of the above maleimido-terminated polycarbonate and 2 parts of dicumyl peroxide. A film was made from the blend by pressing it for 2 minutes at 175° C. and 3,000 p.s.i. The film was insoluble in methylenechloride and would not stress craze with acetone. The film had a cut-through of 230° C. when placed between two 50 mil wires under a 1,000 g. load in accordance with the cut-through test procedure described in Precopio et al. Pat. 2,936,296.

A film was made following the same procedure except that in place of p-maleimidobenzoic acid, there was utilized phenol. After the same press cure, the film was found to have a cut-through of 137° C.

EXAMPLE 2

A mixture of 27.3 parts of bisphenol-A, 7.29 parts of p-tetrahydrophthalimidophenol, 27 parts of pyridine and 300 parts of methylene chloride was phosgenated until a 2° C. drop in temperature was noted. The excess phosgene was then quenched with several parts of 6 N-hydrochloric acid. A powder was precipitated by pouring the solution into methanol in a Waring Blender, filtering and drying in air. It was redissolved in additional methylene chloride and reprecipitated in methanol. The product was then recovered by filtering the precipitate. It was dried at reduced pressure at 90° C. Based on method of preparation, the product was a p-tetrahydrophthalimido-terminated polycarbonate having the approximate formula,

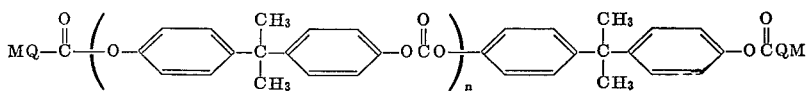

where $n$ is an integer having the approximate average value of 7, and MQ is,

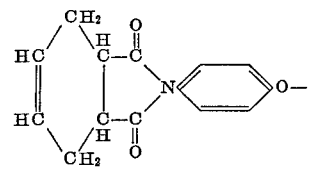

Its identity was further confirmed by N analysis: Theoretical: 0.57%; found: 0.58%.

A portion of the above tetrahydrophthalimido-terminated polycarbonate is heated on a hot plate at 250° C. for ½ hour. A film is obtained which is a valuable insulating coating for aluminum and copper wire.

EXAMPLE 3

A mixture of 57 parts of bisphenol-A, 11.5 parts of p-endomethylenetetrahydrophthalimidophenol, 650 parts of methylene chloride, and 54 parts of pyridine was stirred and phosgenated until a 2° drop in temperature was obtained. The excess phosgene was then quenched with the addition of several parts of 6 N-hydrochloric acid solution. The solution was then added to methanol in a Waring Blender to precipitate the polymer. The polymer was filtered, and dried in air. It was then redissolved in additional methylenechloride and reprecipitated in methanol. The mixture was then filtered and the product dried under reduced pressure at 100° C. Based on method of preparation, the product was an MQ-terminated polycarbonate of the formula,

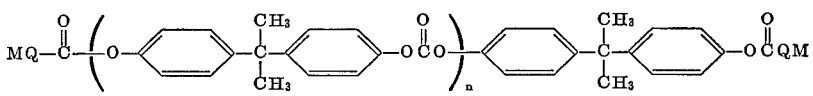

where $n$ is an integer having the approximate average value of 12, and MQ is,

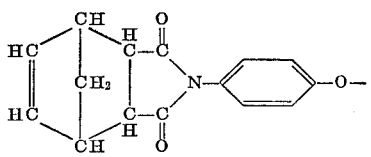

EXAMPLE 4

A blend was made by mixing 50 parts of the maleimido-terminated polycarbonate of Example 1, 50 parts of styrene, and 1½ parts of benzoyl peroxide.

Additional blends were made following the same procedure, substituting diallylphthalate and N-phenylmaleimide for styrene. The various blends were respectively dissolved in 3:1 ethylene chloride-methylene chloride solvent. Films were cast from the solutions and cured from 75° C.–250° C. for 1 hour. The films were found to be insoluble in methylene chloride and would not melt at temperatures as high as 320° C. All of the films had valuable insulating and dielectric properties.

EXAMPLE 5

A blend of 10 parts of the maleimido-terminated polycarbonate of Example 1, 40 parts of polyvinylchloride, and 1 part of dicumyl peroxide, was milled at 140° C. The product was press-cured at 165° C. for 30 minutes at 1,000 p.s.i. Another blend was made of 40 parts of polyvinylchloride, and 1 part of dicumyl peroxide, having 10 parts of substantially the same polycarbonate free of MQ radicals. It was cured in the same manner.

The following table shows a comparison of the physical properties obtained from the cured blends where T is tensile (p.s.i.) and E is elongation (percent).

| Parts of MO poly- | 25° C. | | 100° C. | |
| carbonate | T | E | T | E |
|---|---|---|---|---|
| 10 | 8,950 | <10 | 695 | 30 |
| 0 | (¹) | (¹) | (¹) | (¹) |

¹ Too brittle to test.

Another blend was made of 20 parts of the MQ-terminated polycarbonate of Example 1, and 80 parts of a polyphenyleneoxide having an intrinsic viscosity of 0.49 in CHCl₃ at 25° C., which was cast in the form of a film from a tetrachloroethane solution having 20% solids. It was cured at 150° C. for ½ hour and 200° C. for ½ hour.

A further blend was made of the 20 parts of the MQ-terminated polycarbonate, with 80 parts of a polycarbonate having an intrinsic viscosity of 0.50 in dioxane at 30° C., which was cast from tetrachloroethane following the same procedure. It also was cured in accordance with the above procedure with polyphenyleneoxide.

Cut throughs in accordance with the procedure were obtained with the above cured slabs and compared to cured slabs made from peroxide mixtures of the above described polymers free of MQ polymer and containing the same weight percent peroxide. The following table shows the results obtained where "C.T." is cut through:

| Polymer | MO polymer | C.T. |
|---|---|---|
| Polyphenylene oxide | 10 | 180 |
| Do | 0 | 142 |
| Polycarbonate | 10 | 155 |
| Do | 0 | 142 |

EXAMPLE 6

N-(2-chloroethyl) tetrahydrophthalimide was made by the following procedure:

A mixture of 10 parts of N-(2-hydroxyethyl) tetrahydrophthalimide, prepared from tetrahydrophthalic anhydride and ethanolamine, was refluxed with 25 parts of thionylchloride for about 2 hours. Excess thionylchloride was distilled off and the residue was recrystallized from methanol. Based in method of preparation, the product was N-(2-chloroethyl) tetrahydrophthalimide.

A mixture of 5 parts of commercially available polycarbonate prepared from bisphenol A having an intrinsic viscosity of 0.50 in dioxane at 30° C. and 2 parts of the above prepared N-(2-chloroethyl) tetrahydrophthalimide is dissolved in 100 parts of an anhydrous mixture consisting of about 70 parts of tetrachloroethane and 30 parts of nitrobenzene. Boron trifluoride is introduced into the mixture at a rate of about one bubble per second over a period of about 50 hours, while the temperature is maintained at about 65° C. The product is then recovered by precipitation with methanol. Based on method of preparation and spectral analysis, the product is a polycarbonate having about 15 mole percent of

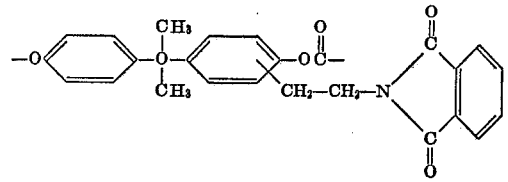

chemically combined with about 85 mole percent of,

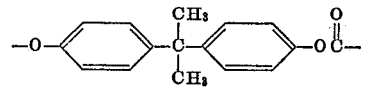

units.

A film as the above imido-substituted polycarbonate is cast from a tetrachloroethane solution onto an aluminum substrate. The film is exposed to β-radiation to a dosage of 50 mr. It is found to be insoluble in several organic solvents including tetrachloroethane and useful as an organic solvent resistant coating.

Although the above examples are limited to only a few of the many imido-substituted polycarbonates included by the present invention, it should be understood that the present invention is directed to a much broader class of imido-substituted polycarbonates which can have both chemically combined diorgano radicals and monoorgano radicals, such as R''' radicals substituted with imido radicals of Formula 1 where the N atom of such imido radicals either can be directly combined to the aforementioned chemically combined radicals in the terminal position of the polycarbonate, or along the polymer backbone, or be joined to the polymer in either of such positions by a divalent connecting organo radicals having 2 or more carbon atoms, including alkylene radicals such as -(CR'₂)ₓ, where x is an integer having a value of from 2 to 4 inclusive, divalent aromatic carbocyclic radicals having from 6 to 18 carbon atoms, where such alkylene radicals, or divalent aromatic carbocyclic radicals can be joined directly to the polymer by a carbon-carbon bond, or an ester, amide, carbonate or either linkage.

We claim:

1. A resinous aromatic polycarbonate having at least one chemically combined aliphatically unsaturated imido radical of the formula

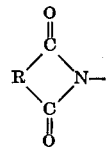

joined directly to a carbon atom in an aromatic carbocyclic ring by a divalent radical selected from the group consisting of

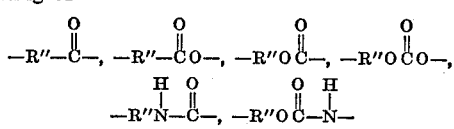

where R is an aliphatically unsaturated divalent organic radical selected from the group consisting of hydrocarbon radicals and halogenated hydrocarbon radicals, R'' is a divalent radical selected from the group consisting of hydrocarbon radicals and halogenated hydrocarbon radicals.

2. An imido-substituted polycarbonate in accordance with claim 1, consisting essentially of chemically combined carbonate units of the formula

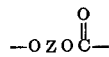

where Z is a divalent aromatic organo radical.

3. An imido-substituted polycarbonate composition in accordance with claim 1, of the formula

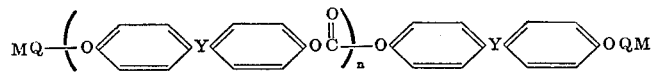

where M is the aliphatically unsaturated imido radical, Q is a divalent radical selected from the group consisting of

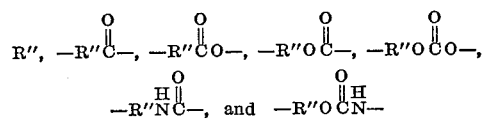

Y is a divalent organo radical selected from the group consisting of,

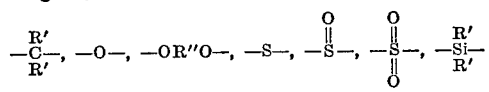

R' is a monovalent radical selected from hydrogen, hydrocarbon radicals, and halogenated hydrocarbon radicals, R" is a divalent radical selected from the group consisting of hydrocarbon radicals and halogenated hydrocarbon radicals, and $n$ is an integer equal to from 5 to 500 inclusive.

4. An imido-substituted polycarbonate in accordance with claim 3, of the formula,

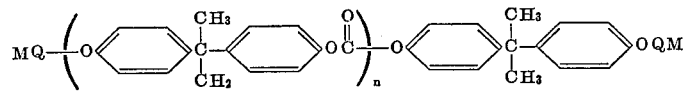

where MQ is

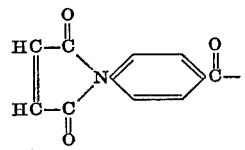

and $n$ is an integer equal to 1 to 1,000 inclusive.

5. An imido-substituted polycarbonate in accordance with claim 2, of the formula,

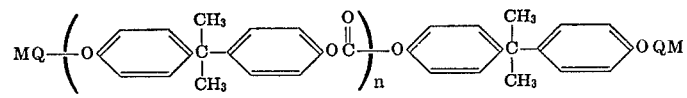

where $n$ has the average value of from 1 to 1,000, and MQ is,

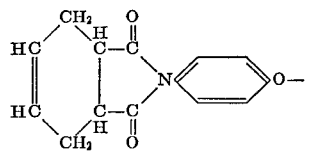

6. An imido-substituted polycarbonate in accordance with claim 2, of the formula,

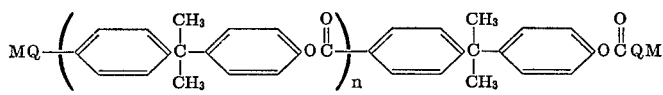

where $n$ is an integer having the average value of 1 to 1,000, and MQ is

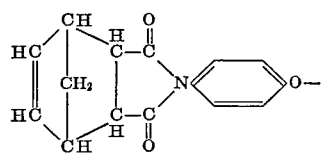

7. An imido-substituted polycarbonate in accordance with claim 2 consisting essentially of chemically-combined

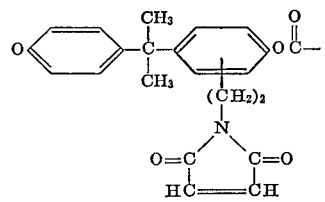

units, and

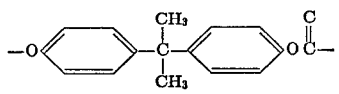

units.

8. An imido-substituted polycarbonate composition in accordance with claim 2 of the formula,

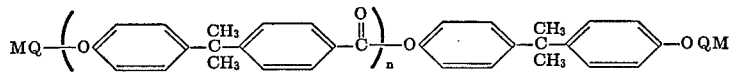

where *n* is an interger equal to 1 to 1,000 inclusive, and MQ is
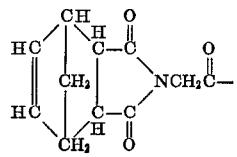
9. The product obtained by curing the polycarbonate of claim 1, at a temperature in the range of from 50° C. to 300° C.
References Cited
UNITED STATES PATENTS
| | | | |
|---|---|---|---|
| 2,997,459 | 8/1961 | Schnell at al. | 260—47 XA |
| 3,221,080 | 11/1961 | Fox | 260—860 |
| 3,352,832 | 11/1967 | Barr et al. | 260—78 UA |
| 3,380,964 | 4/1968 | Grundschober et al. | 260—78 UA |
| 3,413,379 | 11/1968 | Schade et al. | 260—78 UA |
HAROLD D. ANDERSON, Primary Examiner
U.S. Cl. X.R.
117—161 UN, 161 UA; 204—159.14, 159.22; 260—33.8 R, 40 R, 47 CZ, 47 UA, 78 UA, 860, 873